UNITED STATES PATENT OFFICE.

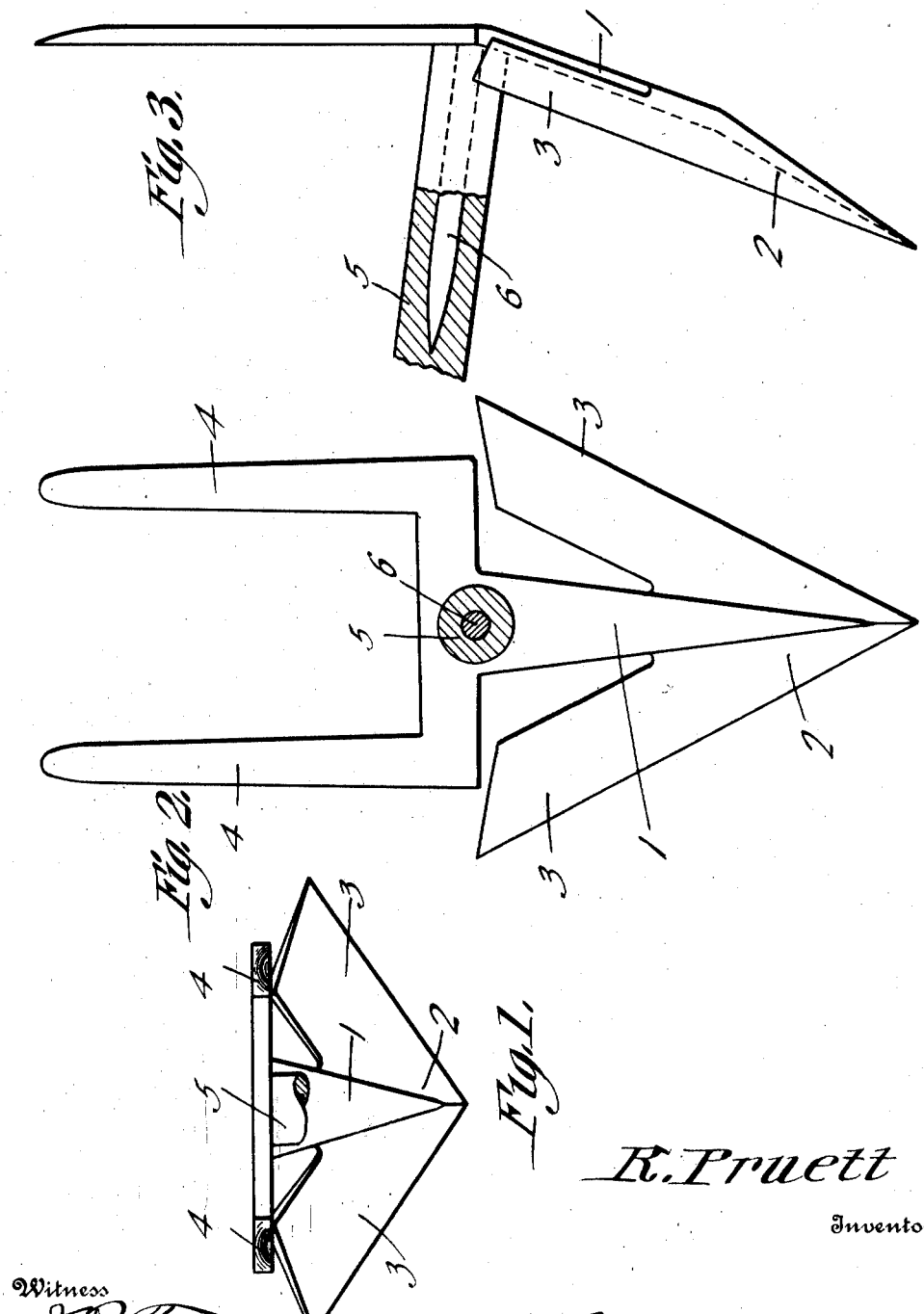

ROSS PRUETT, OF JACKSONVILLE, ALABAMA.

GARDEN-TOOL.

1,341,196. Specification of Letters Patent. Patented May 25, 1920.

Application filed March 24, 1919. Serial No. 284,745.

*To all whom it may concern:*

Be it known that I, Ross PRUETT, a citizen of the United States, residing at Jacksonville, in the county of Calhoun and State of Alabama, have invented a new and useful Garden-Tool, of which the following is a specification.

This invention relates to garden tools, one of its objects being to provide an inexpensive and efficient device of this character which can be used readily for various purposes, such as laying off rows, covering seeds, cultivating plants and preparing the soil.

Another object is to provide an implement of this nature the parts of which can be taken apart for convenience in shipping and sharpening and which, when in use, will maintain their proper relative positions.

With the foregoing and other objects in view, which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a plan view of the implement.

Fig. 2 is a front elevation thereof, the handle being shown in section.

Fig. 3 is a side elevation, a portion being shown in section.

Referring to the figures by characters of reference 1 designates a shank extending to a point and formed integral with this point is a V shaped blade 2 the wings of which are spaced from the shank as shown. These wings have the planes of their edges converging rearwardly as shown particularly in Fig. 1 and the edges of the wings are sharpened and come to a point. The shank 1 is tapered and is provided at that end thereof remote from the point, with a part 4 the teeth or tines of which are bowed transversely thus to be better able to resist the strains.

One end of a handle 5 is secured against the shank 1 at the forked end thereof and is held thereto by a screw 6 inserted from the back of the standard which serves to bind the handle to the standard. The screw can be removed rapidly when it is desired to pack or sharpen the implement.

The fork can be used for preparing the soil and will constitute an efficient clod breaker and soil pulverizer. The plow can be used for laying off rows, for covering seeds and for cultivating plants.

What is claimed is:

A garden tool including a V-shaped blade the wings of which have their edges in planes converging, a shank extending from the blade and bisecting the angle between the wings, the back face of the shank and a portion of the blade being parallel with the plane of the forward edges of the wings, the said wings merging, between the point of the blade and the space between the wings, along a line converging downwardly to the plane occupied by the front edges of the wings.

In testimony that I claim the foregoing as my own I have hereto affixed my signature in the presence of two witnesses.

ROSS PRUETT.

Witnesses:
A. C. CURRIER,
JOHN F. TREADSWAY.